US006794327B2

(12) United States Patent
Youngs et al.

(10) Patent No.: US 6,794,327 B2
(45) Date of Patent: Sep. 21, 2004

(54) SUPRAMOLECULAR STRUCTURES AND PROCESS FOR MAKING THE SAME

(75) Inventors: Wiley J. Youngs, Akron, OH (US);
Claire A. Tessier, Akron, OH (US);
Peter L. Rinaldi, Lodi, OH (US);
Yanhui Niu, College Station, TX (US)

(73) Assignee: The University of Akron, Akron, OH (US)

( * ) Notice: Subject to any disclaimer, the term of this patent is extended or adjusted under 35 U.S.C. 154(b) by 13 days.

(21) Appl. No.: 09/888,118

(22) Filed: Jun. 22, 2001

(65) Prior Publication Data

US 2001/0039328 A1 Nov. 8, 2001

Related U.S. Application Data

(63) Continuation of application No. 09/299,887, filed on Apr. 27, 1999.
(60) Provisional application No. 60/083,215, filed on Apr. 27, 1998.

(51) Int. Cl.$^7$ ................................................ B01J 31/00
(52) U.S. Cl. ...................... 502/152; 502/158; 502/172; 502/402
(58) Field of Search .................... 502/152; 525/158, 525/172, 402, 540; 528/480, 488, 489, 422, 35, 33, 31, 28, 25

(56) References Cited

U.S. PATENT DOCUMENTS

| | | | |
|---|---|---|---|
| 4,507,466 A | 3/1985 | Tomalia et al. | |
| 4,558,120 A | 12/1985 | Tomalia et al. | |
| 4,568,737 A | 2/1986 | Tomalia et al. | |
| 4,587,329 A | 5/1986 | Tomalia et al. | |
| 4,694,064 A | 9/1987 | Tomalia et al. | |
| 4,737,550 A | 4/1988 | Tomalia | |
| 5,393,795 A | 2/1995 | Hedstrand et al. | |
| 5,393,797 A | 2/1995 | Hedstrand et al. | |
| 5,527,524 A | 6/1996 | Tomalia et al. | |
| 5,739,218 A | 4/1998 | Dvornic et al. | |
| 5,902,863 A | 5/1999 | Dvornic et al. | |
| 6,288,197 B1 * | 9/2001 | Youngs et al. ................ | 528/25 |

OTHER PUBLICATIONS

"Precursors to Si–N–C–O Ceramics: A Reinvestigation of the Polymethylvinylsilylethylenediamine Systems" by Feng et al., *Department of Chemistry, Clark Atlanta University*, pp. 897–902 (undated).
"Studies in Silico–Organic Compounds. VII. The Preparation and Properties of Certain Substituted Silanes" by Jenkins et al., *Contribution from the Department of Chemistry of The University of Buffalo*, pp. 863–866 (Jun. 18, 1948).
"Concepts of Trapping Topologically by Shell Molecules" by Mieczyslaw Maciejewski, *J. Macromol. Sci.–Chem.*, A17(4), pp. 689–703 (1982).

"Acyclic Diene Metathesis Polymerization. Synthesis and Characterization of Unsaturated Poly[carbo(dimethyl)silanes]" by K.B. Wagener and D.W. Smith, Jr. *Macromolecules*, 24, pp. 6073–6078 (1993).
"Into the Third Dimension of Coordination Chemistry: Towards Starburst Arrays" by Constable et al., *Supramolecular Chemistry*, pp. 219–233 (1992).
"Arborols Based on Luminescent and Redox–Active Transition Metal Complexes" by Serroni et al., *Angew. Chem. Int. Ed. Engl.*, 31, No. 11, pp. 1493–1495 (1992).
"Metathesis of Silicon–Containing Olefins" by Finkel'shtein et al., *Journal of Molecular Catalysis*, 76, pp. 133–144 (1992).
"Hybrid Organosilazane/Organosilylamine Telechelic Oligomers—1. Two–Dimensional NMR Spectroscopy Characterization of Dimethylsilylethylenediamine Oligomers" by Feng et al., *Applied Organometallic Chemistry*, vol. 7, pp. 253–267 (1993).
"Organometallic Silicon Dendrimers" by Alonso et al., *J. Chem. Soc., Chem Commun.*, pp. 2575 (1994).
"Metathesis of Vinylsubstituted Silanes in the Presence of Ruthenium Complexes" by Marciniec et al., *Journal of Molecular Catalysis*, 90, pp. 213–224 (1992).
"Metathetical Activity of Allylsubstituted Silanes in the Presence of Ruthenium Complexes" by Marciniec et al., *Journal of Molecular Catalysis*, 90, pp. 125–133 (1994).
"Dendrimers of Nanometer Size Based on Metal Complexes: Luminescent and Redox–Active Polynuclear Metal Complexes Containing Up to Twenty–Two Metal Centers" by Campagna et al., *Chem. Eur. J.*, 1., vol. 4, pp. 211–221 (1995).
"Dendrimers: Dream Molecules Approach Real Applications" by Robert F. Service, *Science*, vol. 267, pp. 458–459 (1995).
"Routes to Dendritic Networks: Bis–Dendrimers by Coupling of Cascade Macromolecules Through Metal Centers" by Newkome et al., *Angew. Chem. Int. Ed. Engl.*, 34, No. 18, pp. 2023–2026 (1995).

(List continued on next page.)

*Primary Examiner*—Jeffrey Mullis
(74) *Attorney, Agent, or Firm*—Roetzel & Andress

(57) ABSTRACT

The present invention provides a supramolecular structure produced by the process comprising reacting a multi-generation dendrimer with a monomer, where the dendrimer comprises a core molecule, a plurality of interior generations spherically disposed around the core molecule and an outermost generation comprising a plurality of dendritic branches having terminal groups sufficiently reactive to undergo addition or substitution reactions, where the monomer introduces a labile bond and at least one cross-linkable moiety to the terminal groups of each dendritic branch, and where the cross-linkable moiety is bonded to the terminal group via the labile bond; crosslinking the cross-linkable moieties of adjacent dendritic branches; and cleaving the labile bonds, thereby freeing the dendrimer and forming a molecule encapsulated within a cross-linked shell molecule. The present invention further provides a process for the production of the supramolecular structures.

14 Claims, 4 Drawing Sheets

OTHER PUBLICATIONS

"Water–Soluble Dendritic Iron Porphyrins: Synthetic Models of Globular Heme Proteins" by Dandliker et al., *Angew. Chem. Int. Ed. Engl.*, 34, No. 23/24, pp. 2725–2728 (1995).

"Shell Cross–Linked Knedels: A Synthetic Study of the Factors Affecting the Dimensions and Properties of Amphipilic Core–Shell Nanospheres" by Thurmond et al., *J. Am. Chem. Soc.*, 119, pp. 6656–6665 (1997).

"Shaping Synthetic Metals: Dendrimers Branch Out Into the Electronic World" by Corinna Wu, *Science News*, vol. 151, pp. 384–385 (Jun. 21, 1997).

"Dendrimer–Metalloporphyrins: Synthesis and Catalysis" by Bhyrappa et al., *J. Am. Chem. Soo.*, 118, pp. 5708–5711 (1996).

"Synthesis of Silylene–Vinylene Oligomers via Catalytic Polycondensation of Divinyldimethylsilane" by Marciniec et al., *Journal of Polymer Science: Part A: Polymer, Chemistry*, vol. 34, pp. 1443–1445 (1996).

"Reaction of Alkylidenedinitrosylmolybdenum Complexes with Vinyl Trisubstituted Silanes and Subsitututed Acetylenes" by Keller et al., *Journal of Molecular Catalysis A: Chemical*, 104, pp. 213–219 (1996).

"Convergent and Divergent Approaches to Metallocentric Metallodendrimers" by Constable et al., *Chem. Commun.*, pp. 1821 (1996).

"Liquid–Crystalline, Substituted Octakis–(dimethylsiloxy) octasilsequioxanes: Oligomeric Supramolecular Materials with Defined Topology" by Mehl et al. *Angew. Chem. Int. Ed. Engl.*, 35, No. 22, pp. 2641–2643 (1996).

"Tree–Like Molecule Captures Photons" by R. Colin Johnson, *Electronic Engineering Times: Technology*, pp. 37–38 (Dec. 8, 1997).

"Dendrimers, $CO_2$ Take on solvents" by David Rotman, *Chemical Week*, pp. 41 (Oct. 1, 1997).

"Delving into Dendrimers" by Stephen C. Stinson, *Chemical & Engineering News*, pp. 28–30 (1997).

"Direct Visualization of Individual Cylindrical and Spherical Supramolecular Dendrimers" by Hudson et al., *Science*, vol. 278, pp. 449–452 (1997).

"Topic: Using of Triple Resonance and Multi–Dimensional NMR Spectroscopy for the Characterization Star–Branch Polymer Materials" by Weixia Liu, *Oral Presentation*, 4 pages (Nov. 25, 1997).

"Ruthenium–Catalysed Cross Metathesis binding of Functionalized Olefins to Polystyrene Resin via a Novel Allylsilyl Linker Suitable for Electrophilic Cleavage" by Schusfer et al., *Chem. Commun.*, pp. 823–828 (1997).

"Phosphorus–Containing Dendrimers as Multidentate Ligands: Palladium, Platinum, and Rhodium Complexes" by Bardaji et al., *Organometallics*, 16, pp. 403–410 (1997).

"Synthesis of Bowl–Shaped Dendrimers from Generation 1 to Generation 8" by Launay et al., *Journal of Organometallic Chemistry*, 529, pp. 51–58 (1997).

"Olefin Metathesis in Organic Chemistry" by Schuster et al., *Angew. Chem. Int. Ed. Engl.*, 36, pp. 2037–2056 (1997).

"Novel Amphiphilic Linear Polymer/Dendrimer Block Copolymer: Synthesis of poly(2–methyl–2–oxazoline)–block–poly(amido amine) Dendrimer" by Aoi et al., *Macromol. Rapid Commun.*, 18, pp. 945–952 (1997).

"Hyperbranched Polycarbosilane Macromonomers Bearing Oxazoline Functionalities" by Lach et al., *Macromol. Rapid Commun.*, pp. 253–260 (1997).

"Chirality in Dendritic Architectures" by Peerlings et al., *Chem. Eur. J.*, 3, No. 10, pp. 1563–1570 (1997).

"Versatile Complexation Ability of Very Large Phosphino-Terminated Dendrimers" by Majoral, *Inorg. Chem.*, vol. 36, pp. 1939–1945 (1997).

"Olefin Cross–Metathesis with Monosubstituted Olefins" by Brummer et al., *Chem. Dur. J.*, 3, No. 3, pp. 441–446 (1997).

"Dendrimers in Supramolecular Chemistry: From Molecular Recognition to Self–Assembly" by Zeng et al., *Chem. Rev.*, 97, pp. 1681–1712 (1997).

"Synthesis of Cored Dendrimers" by Wendland et al., *J. Am. Chem. Soc.*, 121, pp. 1389–1390 (1999).

* cited by examiner

SUPRAMOLECULAR STRUCTURES AND PROCESS FOR MAKING THE SAME

CROSS REFERENCE TO RELATED APPLICATIONS

The present application is a continuation of U.S. Ser. No. 09/299,887, filed Apr. 27, 1999, which claims the benefit under 35 U.S.C. § 119(e) of U.S. Provisional Application No. 60/083,215, filed Apr. 27, 1998.

TECHNICAL FIELD OF THE INVENTION

The present invention is generally directed toward molecular structures that are synthesized by cross-linking the peripheral surface of dendritic molecules. These cross-linked molecules are believed to be spherical in geometry or structure. The severing or cleaving of labile bonds within the dendritic molecule results in a spherical, cross-linked shell molecule that can encapsulate or entrap smaller molecules. Accordingly, the present invention is directed toward these spherical shell molecules, including those structures that contain smaller molecules within their structure, as well as a process for making the spherical shell molecules.

BACKGROUND OF THE INVENTION

Dendrimers are highly branched macromolecules formed by successive reactions of polyfunctional monomers around a core. Accordingly, as dendrimers grow from their core, their number of branches and terminal end groups increase, thereby increasing the density of these molecules at their peripheral surface.

Dendrimers are distinguishable from polymers because they are non-linear, hyper-branched structures that are synthesized in iterative fashion. The monomers from which they are constructed can generally be defined as $AB_n$ monomers, where n is usually 2 or 3, rather than the standard AB monomers, which produce linear polymers. Accordingly, each iteration of step-wise synthetic growth generally requires twice the number of monomers used in the previous iteration in the case of an $AB_2$ monomer, or three times the number of monomers in the case of an $AB_3$ monomer. The layer of monomers added in each iteration is called a generation. The ultimate generation, or that generation farthest from the core, produces the periphery of the molecule.

Because dendrimers are produced in iterative fashion, they can be synthesized to very high molecular weight molecules with narrow molecular weight distributions. Moreover, the nature of each generation can be controlled by controlling the type of monomer employed including the periphery or end groups.

Based on the foregoing, and the relative novelty of dendritic structures, the present invention furthers the art by making advancements in the modification of dendrimer structures, especially in their ability to act as, or produce, a shell to entrap smaller molecules.

SUMMARY OF INVENTION

It is therefore an object of the present invention to provide a core dendrimer having a cross-linked peripheral surface.

It is another object of the present invention to provide a molecule within another cross-linked shell structure, where the two molecules are not covalently or ionically bonded to each other.

It is another object of the present invention to provide a cross-linked hollow shell structure.

It is another object of the present invention to provide a supramolecular structure that allows the flow of small molecules into and out of the central core.

It is another object of the present invention to provide a supramolecular structure capable of entrapping smaller molecules.

It is another object of the present invention to provide a supramolecular structure having a cross-linked surface or peripheral porosity sufficient to entrap smaller molecules.

At least one or more of the foregoing objects, together with the advantages thereof over the known art relating to dendritic molecules and supramolecular structures, which shall become apparent from the specification that follows, are accomplished by the invention as hereinafter described and claimed.

The present invention therefore provides a supramolecular structure produced by the process comprising: reacting a multi-generation dendrimer with a monomer, where the dendrimer comprises a core molecule, a plurality of interior generations spherically disposed around the core molecule and an outermost generation comprising a plurality of dendritic branches having terminal groups sufficiently reactive to undergo addition or substitution reactions, where the monomer introduces a labile bond and at least one cross-linkable moiety to the terminal groups of each dendritic branch, and where the cross-linkable moiety is bonded to the terminal group via the labile bond; cross-linking the cross-linkable moieties of adjacent dendritic branches; and cleaving the labile bonds, thereby freeing the dendrimer and forming a molecule encapsulated within a cross-linked shell molecule.

The present invention further provides a process for producing a supramolecular structure comprising: reacting a multi-generation dendrimer with a monomer, where the dendrimer comprises a core molecule, a plurality of interior generations spherically disposed around the core molecule and an outermost generation comprising a plurality of dendritic branches having terminal groups sufficiently reactive to undergo addition or substitution reactions, where the monomer introduces a labile bond and at least one cross-linkable moiety to the terminal reactive groups, and where the cross-linkable moiety is bonded to the terminal reactive group via the labile bond; cross-linking the cross-linkable moieties of adjacent dendritic branches; and cleaving the labile bonds, thereby freeing the dendrimer and forming a molecule encapsulated within a cross-linkable shell molecule.

The present invention further provides a supramolecular structure produced by the process comprising: reacting a multi-generation dendrimer with a monomer, where the dendrimer comprises a core molecule, a plurality of interior generations spherically disposed around the core molecule and an outermost generation comprising a plurality of dendritic branches having terminal groups sufficiently reactive to undergo addition or substitution reactions, where the monomer introduces a labile bond and at least one cross-linkable moiety to the terminal groups, and where the cross-linkable moiety is bonded to the terminal group via the labile bond; crosslinking the cross-linkable moieties of adjacent dendritic branches; cleaving the labile bonds, thereby freeing the dendrimer and forming a molecule encapsulated within a cross-linked shell molecule; and degrading and removing the free dendrimer, thereby producing a intramolecularly cross-linked spherical hollow shell structure.

A process for producing a supramolecular structure comprising: reacting a multi-generation dendrimer with a monomer, where the dendrimer comprises a core molecule, a plurality of interior generations spherically disposed around the core molecule and an outermost generation comprising a plurality of dendritic branches having terminal groups sufficiently reactive to undergo addition or substitution reactions, where the monomer introduces at least one labile bond and a cross-linkable moiety to the terminal group of each dendritic branch, and where the cross-linkable moiety is bonded to the terminal group via the labile bond; cross-linking the cross-linkable moieties of adjacent dendritic branches; cleaving the labile bonds, thereby freeing the core dendrimer and forming a molecule encapsulated within a cross-linked shell molecule; and degrading and removing the free dendrimer, thereby producing a intramolecularly cross-linked spherical hollow shell structure.

The present invention also provides a supramolecular structure comprising a dendrimer having a cross-linked peripheral surface; a supramolecular structure comprising a hollow cross-linked shell molecule; and a supramolecular structure comprising a dendrimer and a cross-linked shell molecule spherically disposed about the dendrimer, wherein the dendrimer and the cross-linked shell molecule are not ionically or covalently bonded together.

DETAILED DESCRIPTION OF THE INVENTION

Figure 1A:
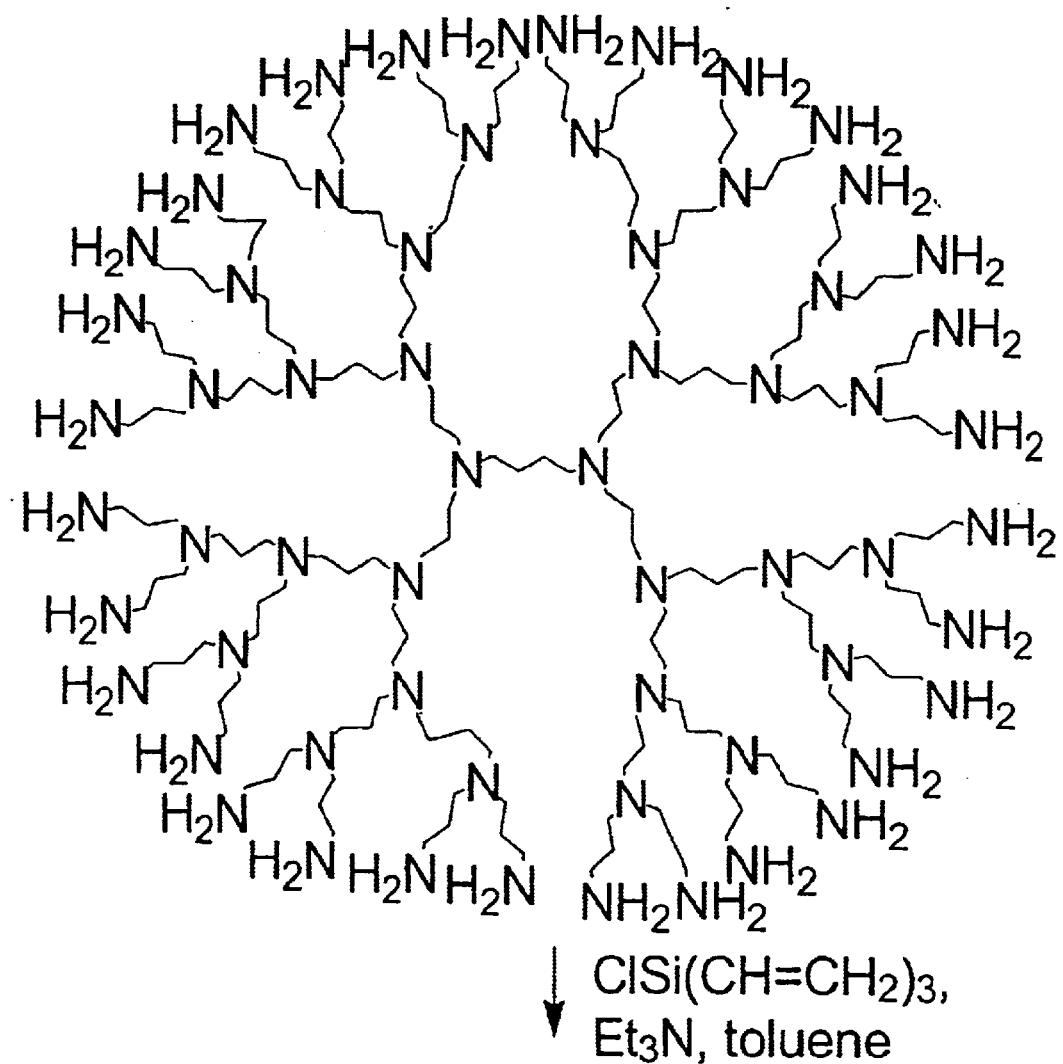
FIG. 1 is a schematic representation of the reaction of a dendrimer and a monomer to produce a dendrimer having a cross-linkable moiety on the terminal end of each dendritic branch of the outermost generation of the dendrimer.
Figure 1B:
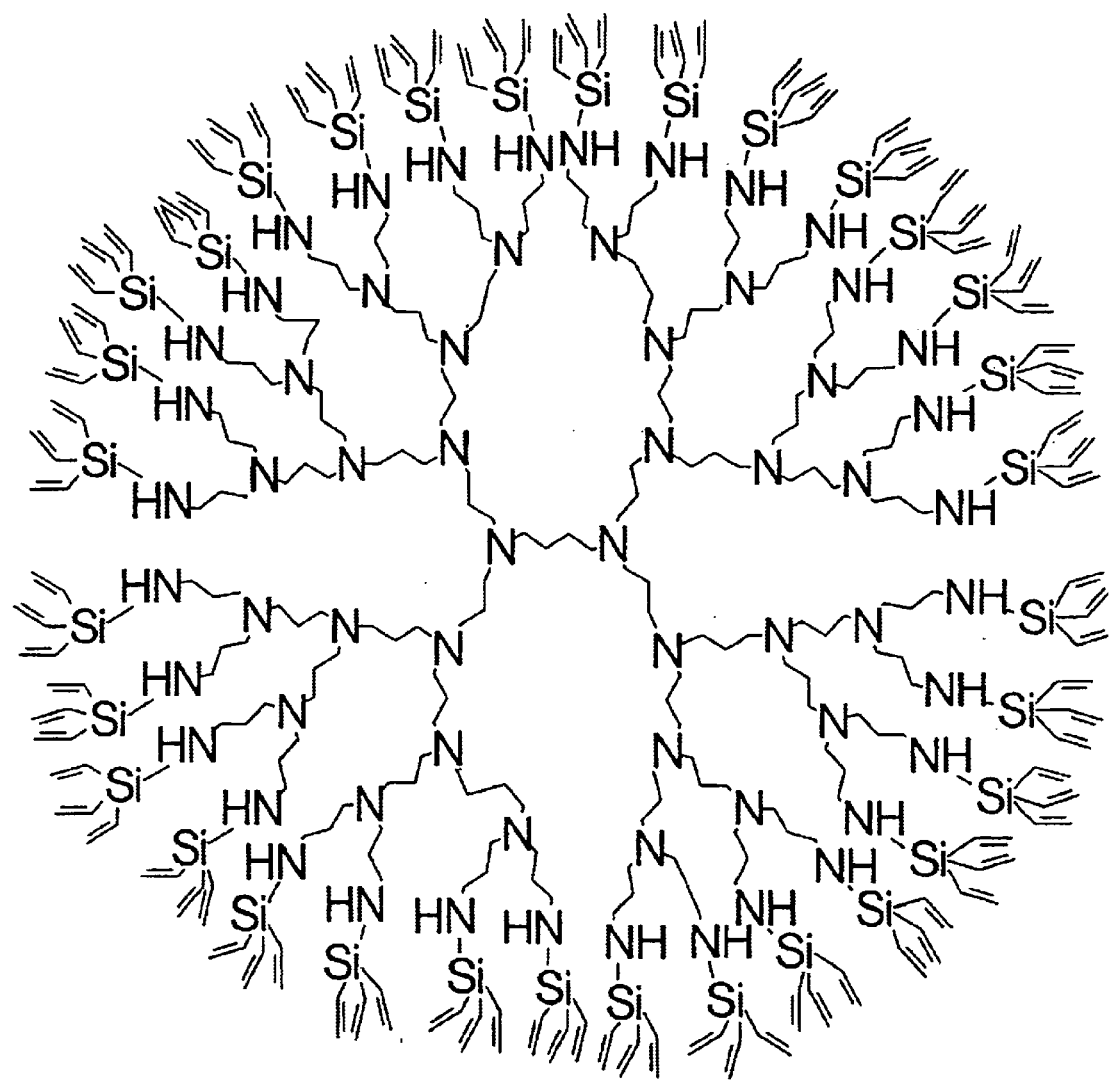
Figure 2:
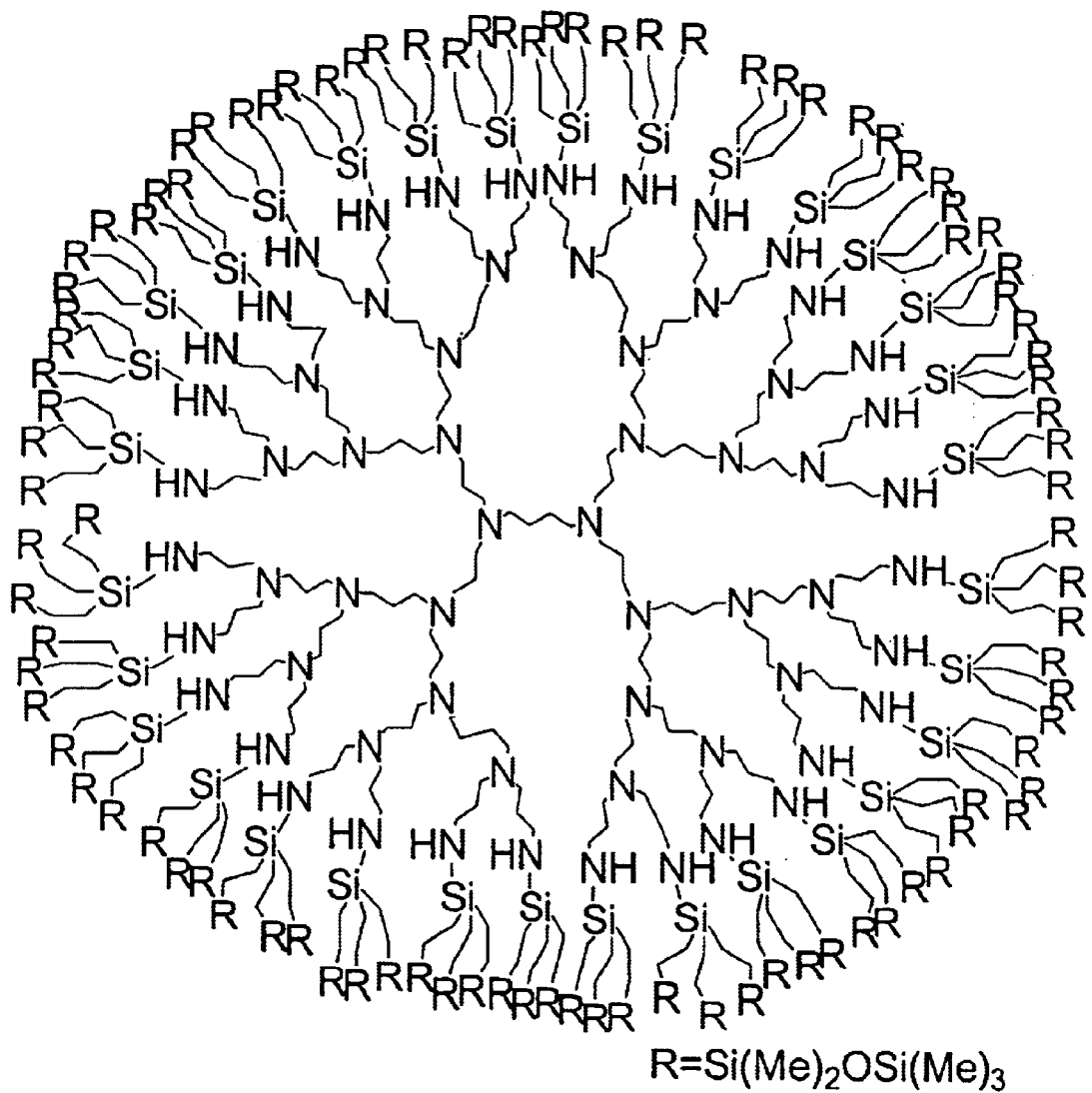
FIG. 2 is a schematic representation of a poly (propyleneimine) dendrimer having a cross-linked peripheral surface pursuant to the present invention.
Figure 3:
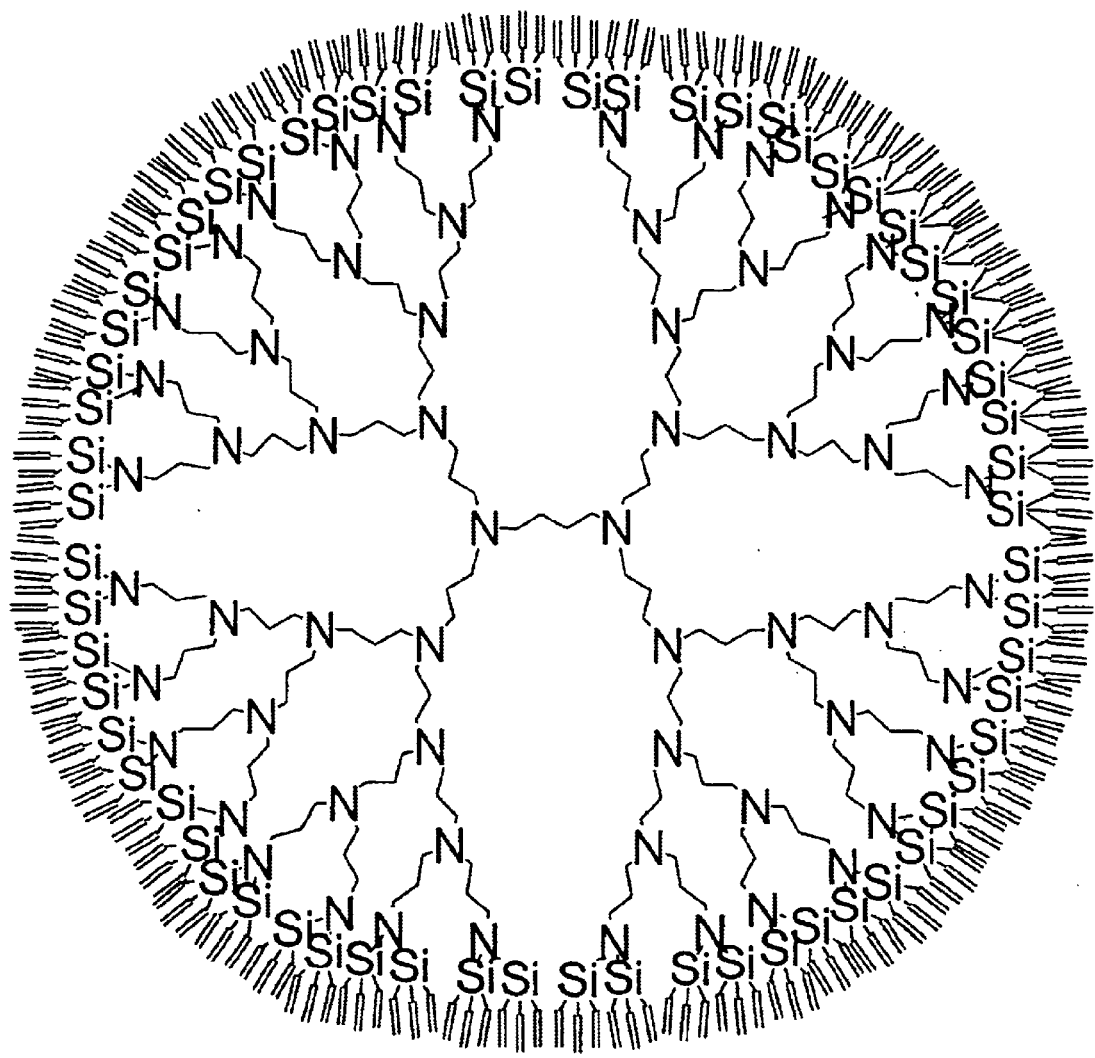
FIG. 3 is a schematic representation of a dendrimer having two cross-linkable moieties on the terminal end of each dendritic branch of the outermost generation.

It has now been found that dendritic structures that contain or are modified to contain terminal or peripheral cross-linkable moieties can be cross-linked to form supramolecular structures. Once cross-linked, the resultant interconnected peripheral surface network may be cleaved or severed from the core molecule to form an independent shell network that is not chemically bonded to the core molecule. In another embodiment of the present invention, the core molecule, which can include a majority of the dendritic network, can be degraded and removed. Where the core is left intact and only severed from the shell, a molecule encapsulated within a cross-linked shell molecule is formed. Where the core molecule is degraded, a porous, hollow spherical shell structure simply remains. The supramolecular structures of the present invention are porous and are capable of entrapping or encapsulating smaller molecules, and are capable of allowing small molecules or the like to pass into or out of its network.

Because the supramolecular shells of the present invention are formed by cross-linking the surface of dendritic molecules, the surface of the resultant molecular shell will be porous. The porosity of the shell is a function of many variables, including, but not limited to, the size of the dendrimer that is cross-linked, the dendrimer's density at the surface of the dendrimer, the number of cross-linkable moieties or reactive sites within the periphery monomers of the dendrimer, and the crosslinking agents employed.

In one embodiment, the present invention provides a supramolecular structure produced by cross-linking the periphery of core dendrimer and severing the core from the cross-linked network. The core dendrimer comprises a core molecule, a plurality of interior generations, each generation comprising a plurality of dendritic branches spherically disposed around the core molecule and an outermost generation or periphery comprising a plurality of dendritic branches having terminal reactive groups sufficiently reactive to undergo addition or substitution reactions. The core dendrimer is reacted with a monomer thereby resulting in the addition of a generation to the dendrimer. The monomer also introduces a labile bond and at least one cross-linkable moiety to the terminal reactive group of each dendritic branch of the outermost generation or periphery. The cross-linkable moiety is bonded to the terminal groups via the labile bond. The cross-linkable moieties of adjacent dendritic branches are then cross-linked with a cross-linking agent to produce a dendrimer having a cross-linked peripheral surface. The labile bonds of each dentritic branch are subsequently cleaved, thereby freeing the core dendrimer and forming a freed molecule encapsulated within a cross-linked shell molecule. The freed dendrimer and cross-linked shell structure are not ionically or covalently bonded together.

A dendrimer or dendritic structure is a unimolecular assemblage having three distinguishing architectural features, namely, a core; interior generation layers or interior generations; and exterior surface of terminal moieties attached to the outermost generation. The topology of a dendrimer is achieved by the ordered assembly of repeating units in concentric, dendritic tiers around a core molecule. The size and shape of dendrimers and the moieties present in the dendrimer molecule can be controlled by the choice of the core, the number of generations employed in creating the dendrimer, and the choice of the repeating units at each generation.

Any dendrimer molecule can be utilized in the practice of the present invention. Preferred dendrimers include nitrogen-containing and carbosilane dendrimers, such as poly(propyleneimine) (DAB) and polyamidoamine (PAMAM) dendrimers. It is also preferred that the dendrimers have sufficient density at their periphery, although it should be appreciated that any dendrimer can be modified to yield an adequate peripheral density. Inasmuch as there are a number of dendrimers that can or have been synthesized, the skilled artisan practicing the present invention can simply select a dendrimer with dendrictic branches having a cross-linkable end or terminal groups, or the cross-linkable groups can be added to the periphery of the dendrimer. Other useful dendrimer molecules include, for example and without limitation, those described in U.S. Pat. Nos. 4,507,466, 4,558,120, 4,568,737 and 4,587,329 as well as those described in Dendritic Molecules, Concepts, Syntheses, Perspectives. Newkome et al., VCH Publishers, Inc. New York, N.Y. (1996).

As mentioned above, the core could contain a variety of functionalities that would prove useful in the final device. Commercially available poly(propylenimine) DAB series and poly(amidoamine) (PAMAM) dendrimers are useful as the core dendrimer. These dendrimers are available in a number of generations. For example, DAB-16 is the parent third generation dendrimer with 16 terminal $NH_2$ groups, DAB-32 is a fourth generation dendrimer terminated with 32 $NH_2$ groups, and DAB-64 is the analogous fifth generation dendrimer with 64 terminal $NH_2$ groups.

The periphery moieties of the precursor dendrimers must be cross-linkable or polymerizable. In other words, the ultimate or external generation must include or be formed from monomers or moieties that have reactive moieties that are sufficiently reactive to undergo addition or substitution reactions at the terminal portions of each dendritic branch of the ultimate generation. It is preferred that these terminal monomers include at least three reactive moieties, especially in situations where the outer shell will ultimately be severed or freed from the inner core molecule. Preferred periphery moieties include those that contain some level of unsaturation.

Typically, commercially available dendrimers do not contain terminal groups or moieties that are easily cross-linkable. Therefore, it is desirable to modify the base dendrimer by introducing cross-linkable moieties at the periphery of the core dendrimer. The skilled artisan will be able to readily determine the proper reaction conditions necessary to add cross-linkable monomeric units to the terminal portion of each dendritic branch of the core or precursor dendritic molecule.

Suitable monomers, such as trialkenesilanes, can be used to introduce unsaturated cross-linkable moieties to the terminal reactive groups of each dendritic branch. These reactive trialkenesilane monomers include, but are not limited to, trivinylchlorosilane, triallychlorosilane, tripropargylchlorosilane and diallylchlorosilane. Trivinylchlorosilane is the most preferred reactive monomer. Depending on the polymerization or cross-linking technique employed, a number of polymerizable end groups can be employed. The resulting structure is a dendrimer having cross-linkable moieties bonded to the terminal end of the dendritic branches comprising the outermost or peripheral generation of the dendrimer. The reaction of a poly(propylenimine) (DAB) dendrimer, which has dendritic branches with terminal $NH_2$ groups, with trivinylchlorosilane results in the quantitative conversion of terminal $NH_2$ groups to $NH\text{-}Si(CH=CH_2)_3$ groups.

In this embodiment, it is preferred that the reactive monomer introduce a labile bond to the terminal reactive group of each dendritic branch. Useful labile bonds include, but are not limited to silicon-oxygen, oxygen-nitrogen, silicon-oxygen-carbon, nitrogen-silicon, nitrogen-carbonyl-nitrogen, silicon-acetylene, amide, blocked isocyanates and urea bonds. The most preferred labile bond is a silicon-nitrogen bond.

As mentioned above, the cross-linkable moitites bonded to the terminal end of the dendritic branches comprising the outermost or peripheral generation of the dendrimer are cross-linked. Suitable crosslinking techniques include hydrosilylation, olefin metathesis reactions, radical polymerizations, controlled radical polymerization, polycondensation reactions, anionic and cationic polymerizations, and coordination polymerization reactions including Ziegler-Natta polymerization reactions. The preferred method for crosslinking the cross-linkable moieties is hydrosilylation, which can be employed to cross-link unsaturated organic groups.

Where hydrosilylation chemistry is employed as the crosslinking method, it is preferred to crosslink the cross-linkable moieties with a monomer or crosslinking agent. Suitable crosslinking agents are selected from double and multiple crosslinking agents. The double crosslinking agents refer to those agents that have two Si—H functional groups that can hydrosilate the terminal unsaturated cross-linkable moieties, which are preferably alkene groups. Multiple cross-linking agents are those agents that have more than two Si—H functional groups that can hydrosilate alkene groups. The preferred double cross-linking agents have the general formula I:

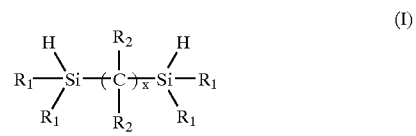

(I)

where $R_1$ is selected from hydrogen or organic groups having from about 1 to about 30 carbon atoms, $R_2$ is selected from hydrogen and organic groups having from about 1 to about 30 carbon atoms, and x is an integer from about 1 to about 4. Preferably, $R_1$ is selected from hydrogen or organic groups having from about 1 to about 15 carbon atoms, $R_2$ is selected from hydrogen and organic groups having from about 1 to about 15 carbon atoms, and x is an integer from about 1 to about 2. Even more preferably, $R_1$ and $R_2$ have less than about 5 carbon atoms.

Nonlimiting examples of double cross-linking agents defined by formula I include $H(CH_3)_2Si(CH_2CH_2)SiH(CH_3)_2$, and $H(C_3H_7)Si(CH_2CH_2)SiH(C_3H_7)$. Oxygen based curatives may also be employed such as tetramethyldisiloxane ($H(CH_3)_2Si(O)SiH(CH_3)_2$).

Suitable multiple cross-linking agents for crosslinking for the terminal cross-linkable moieties of the supramolecular structures of the present invention include, but are not limited to, $CH_3Si(CH_2CH_2Si(CH_3)_2H)_3$, $CH_3(CH_2SiH_2)_2CH_3$, $HC(Si(R^1)_2H)_3$, $Si(R^1)_2H_2$, and $(SiR^1H\text{—}O\text{—})_4$; wherein $R^1$ is selected from the group consisting of hydrogen and organic groups having from about 1 to about 15 carbon atoms.

The multiple cross-linking agents may also include linear polymers having Si-H functionalities as part of or pendant from the polymer chain, cyclic compounds having Si-H functionalities as part of or pendant from the ring, a dendrimer having Si-H functionalities, and mixtures of these three types of cross-linking agents. Useful linear polymers include, but are not limited to, $(CH_3)_3Si\text{—}O\text{—}(SiR^2H\text{—}O)_n\text{—}Si(CH_3)_3$, wherein R is selected from methyl and ethyl groups and wherein n is a positive integer from about 10 to about 100, preferably about 10 to about 50 and most preferably from about 10 to about 30; $H(CH_3)_2Si\text{—}O\text{—}(SiPh(\text{—}OSi(CH_3)_2H)\text{—}O)_n\text{—}Si(CH_3)_2H$, wherein n is a positive integer from about 10 to about 100, preferably about 10 to about 50 and most preferably from about 10 to about 30; $(CH_3)_3Si\text{—}O\text{—}(Si(CH_3)(H)\text{—}O)_m\text{—}(Si(CH_3)(C_8H_{17})\text{—}O)_n\text{—}Si(CH_3)_3$, wherein m is a positive integer from about 10 to about 100, preferably about 10 to about 50 and most preferably from about 10 to about 30, and wherein n is a positive integer from about 10 to about 100, preferably about 10 to about 50 and most preferably from about 10 to about 30; and $H_2R^3Si(SiR^3H)_n\text{—}SiR^3H_2$; wherein R is selected from alkyl and aryl groups having from about 1 to about 15 carbon atoms, and wherein n is a positive integer from about 10 to about 100, preferably about 10 to about 50 and most preferably from about 10 to about 30. The selection of a suitable cross-linking agent should not limit the scope of the invention.

It should be noted that the Si—H functionalities of the double and multiple cross-linking agent may be replaced by any functional group that adds across a double bond, and that capable of cross-linking alkene groups on the peripheral generation or surface of the dendrimer. Suitable functional groups that may replace the Si—H cross-linking groups include, but are not limited to B—H, P—H, As—H, and M—H, wherein M is selected from d-block and p-block metals. Suitable p-block metals include, but are not limited to Ge and Sn.

Without being bound to any particular theory, the linear polymer may crosslink the dendrimer surface by wrapping itself around the outer periphery of the dendrimer, and cross-linking the cross-linkable moieties of the peripheral surface of the dendrimer. The linear polymer must be long enough to wrap around a significant portion of the dendrimer and, therefore, the length of the dendrimer can vary based upon the size of the dendrimer to be cross-linked. Furthermore, several linear polymer chains may be required to fully cross-link the dendrimer and there may be overlapping of the linear polymer cross-linking agents on the dendrimer surface.

Hydrosilylation (also known as hydrosilation) reactions are carried out under dilute conditions in order to favor intramolecular crosslinking over intramolecular cross-linking, and typically take place in the presence of a catalyst such as the Karstedt's catalyst, which is a platinum alkene. Karstedt's catalyst is commercially available from Gelest. Other catalysts that can be employed include $H_2PPCl_6$ and $Cr(CO)_6$.

Before cross-linking of the core dendrimer, the labile bonds are susceptible to hydrolysis with water. In contrast, a dendrimer having a cross-linked peripheral network is stable in water. The dendrimer having a cross-linked peripheral network requires dilute acid, such as hydrochloric acid, instead of water to liberate free dendrimer and the cross-linked shell structure as separate molecules.

As those skilled in the art will appreciate, of the crosslinking agent, which is a function of the integer x, will affect the rigidity and pore size of the interconnected surface network. Shorter organic chains will provide a more rigid shell with less permeability, while longer chains will provide a more flexible shell with greater permeability.

With reference to formula I, it should also be appreciated that $R_1$ and $R_2$ can be selected to provide further functionality to the molecule. For example, $R_1$ and $R_2$ can include moieties, such as sulfates, carboxylate, or other hydrophilic moieties, that can provide greater solubility to the molecule in hydrophilic systems, or $R_1$ and $R_2$ can include a long chain alkyl or similar moiety, that can provide greater solubility to the molecule in lipophilic environments.

As mentioned hereinabove, the term organic group, as used herein, can include any carbon based group, moiety, or radical having from about 1 to about 15 carbon atoms. Preferably, the organic group is a group, moiety or radical that will not inhibit the hydrosilation reaction, or otherwise deleteriously impact the supramolecular structures of the present invention. Additionally, the carbon based groups can include hetero atoms such as oxygen, nitrogen, sulfur, phosphorous, or silicon. Or, for purposes of this specification, the term organic groups will likewise refer to silicon based groups such as silicon chloride groups. Specifically, the carbon based groups can be aliphatic, cycloaliphatic, and aromatic groups. The aliphatic groups can be saturated or unsaturated and therefore can include alkanes, alkenes, alkynes, alkoxys and polyethers. Exemplary organic groups include alkyl groups, carboxyl groups, alcohol groups, and amino groups.

Alternatively, intramolecular cross-linking of a dendrimer having unsaturated cross-linkable moieties can be achieved by olefin metathesis by using ring opening metathesis polymerization (ROMP) or acyclic diene metathesis (ADMET) catalysts. Because no cross-linking agent, per se, is employed that will add to the intramolecular cross-linked network, the rigidity and permeability of the molecular shells produced by olefin metathesis is controlled by the size and nature of the substituents of the dendrimer. Diallylsilanes are quite active in olefin metathesis and are reported to give high yield polymers at low temperature. Subjecting the triallylsilane covered dendrimers to olefin metathesis may initially give the formation of five membered rings when an allyl group on a silicon undergoes olefin metathesis with another allyl group on the same silicon; however, cyclopentenes undergo productive ring opening metathesis polymerizations (ROMP).

A variety of catalysts can be employed to accomplish olefin metathesis. These catalysts include, but are not limited to, Osborne's, Schrock's, and Grubb's catalysts. As is generally known in the art, Schrock's catalyst is a molybdenum-tungsten-carbene complex, and Grubb's catalyst is a ruthenium-carbene-phosphine complex.

For example, a dendrimer having an outer periphery of dialkyl silane groups will give rise to the formation of a five membered ring when an allyl group on a silicon atom undergoes olefin metathesis with another allyl group on the same silicon atom.

It should be understood that the nature of the crosslinked interconnected surface is dependent on the periphery groups. For example, vinyl silane covered or terminated dendrimers do not undergo homopolymerzation, but rather undergo copolymerization with added dienes such as 1,9-decadiene. Divinyl dimethylsilane, however, undergoes homopolymerization with $RuCl_2(Ph_3)_3$ to give silyene-vinylene oligomers by acyclic diene polymerization.

As mentioned above, once the outermost generation of the core dendrimer has been cross-linked, the labile bonds connecting the cross-linked moieties to the core dendrimer are cleaved or severed, thereby freeing the core dendrimer from the cross-linked shell molecule. Depending on the labile bond that exists in each dendritic branch, a number of techniques may be employed to sever or cleave the labile bonds. For example, one method that can be employed when the labile bond is a nitrogen-silicon bond includes placing the cross-linked core dendrimer structure in a dilute acidic solution, such as hydrochloric acid.

Those skilled in the art will appreciate that the core molecule, i.e., that molecule that has been entrapped within the super-molecular structure of the present invention, can be the starting or precursor dendrimer, or a derivative thereof. This is especially true where the labile bond is positioned farther from the core of the precursor dendrimer. It is also possible, however, to select or place the labile bond closer to or adjacent to the core of the precursor dendrimer. In some situations, the freed cored may be small enough to escape out of the interconnected shell network. It should also be understood that where the labile bond is not adjacent to the outer cross-linked periphery, moieties that were once a part of the precursor dendritic network will extend from the cross-linked surface. These moieties will typically extend inward into the shell, but, based on the environment and porosity of the surface, these moieties may extend outwardly as well.

In another embodiment, the present invention provides a supramolecular structure produced by crosslinking the periphery of a core dendrimer, severing the core from the cross-linked network and degrading the inner core molecule. The core dendrimer comprises a core molecule, a plurality of interior generations, each generation comprising a plurality of dendritic branches spherically disposed around the core molecule, and an outermost or periphery generation comprising a plurality of dendritic branches having terminal groups sufficiently reactive to undergo addition or substitution reactions. The core dendrimer is reacted with amonomer thereby resulting in the addition of a generation to the dendrimer. The monomer also introduces a labile bond and at least one cross-linkable moiety to the terminal group of each dendritic branch of the outermost generation or periphery. The cross-linkable moiety is bonded to the terminal group via the labile bond. The cross-linkable moieties of adjacent dendritic branches are then cross-linked as disclosed hereinabove. The labile bonds of each dentritic branch are cleaved, thereby freeing the core dendrimer and forming a molecule encapsulated within a cross-linkable shell structure. The free dendrimer is subsequently degraded and removed, thereby producing a intramolecularly cross-linked shell structure that is empty or hollow. The dendrimer is prepared in the same manner as described hereinabove and the core or precursor dendrimer is chosen from dendrimers having a branched network comprising many labile bonds.

The severing of the labile bonds within the branched network of the core or precursor dendrimer can cause the complete destruction of the inner dendritic network. Depending on the size of the resulting fragmented pieces of the precursor dendrimer, the outer cross-linked surface may allow the fragmented pieces to pass through the wall of the shell and into the surrounding medium. In the event that all of the fragmented pieces are able to escape from the shell structure or are otherwise removed, the supramolecular structure of the present invention will simply be an empty or hollow cross-linked shell molecule.

The synthetic route to producing the supramolecular structures of the present invention may include the incorporation of at least one labile generation within the dendritic structure of the base or precursor dendrimer. This is preferred where it is desired to sever the outer interconnected shell network form the inner core of the molecule and thereby form a shell molecule having a spherical topology. As the skilled artisan will appreciate, the labile bond will be incorporated into the dendritic network simultaneously with the addition of the peripheral generation that will ultimately be cross-linked to form the interconnected shell network. It should also be appreciated that the monomers used to form the periphery generation may themselves contain a labile bond that can be employed to sever the shell from the core. Still further, the starting or precursor dendritic structure may contain one or more labile bonds. In the latter two situations, therefore, the incorporation of a labile bond into the dendritic network is not a necessary step toward achieving the molecules of the present invention.

The skilled artisan will readily understand what is meant by the term labile bond. Preferably, these bonds are those chemical bonds between atoms within a molecule that can be severed under controlled conditions or when desired. For example, it is known that silicon-acetylene bonds can be severed in the presence of potassium fluoride. Other labile bonds include, for example and without limitation, silicon-oxygen bonds, silicon-nitrogen bonds, oxygen-nitrogen bonds, nitrogen-carbonyl-nitrogen bonds, blocked isocyanates and ureas.

In another embodiment, the present invention provides a supramolecular structure produced by cross-linking the peripheral or outermost generation of a core dendrimer. The core dendrimer comprises a core molecule, a plurality of interior generations each interior generation comprising a plurality of dendritic branches, that are spherically disposed around the core molecule, and an outermost or peripheral generation comprising a plurality of dendritic branches having terminal reactive groups sufficiently reactive to undergo addition or substitution reactions. The core dendrimer is reacted with a monomer thereby resulting in the addition of a generation to the dendrimer. The monomer also introduces at least one cross-linkable moiety to the terminal reactive group of each dendritic branch of the outermost or peripheral generation. In this embodiment, the cross-linkable moiety may or may not be bonded to the terminal reactive groups via a labile bond. The cross-linkable moieties of adjacent dendritic branches are then cross-linked with a cross-linking agent to produce a dendrimer having a cross-linked peripheral surface.

The supramolecular structures of the present invention have several potential applications including, but not limited to, applications such as catalytic sites for sequential catalytic reactions and as shape and size selective catalysts, ferromagnetic sites for memory and other electronic devices, sensor sites for sensing chemical molecules, and molecular containers, which might slowly release reactive reagents for performing reactions under high dilution conditions.

For example, in the supramolecular shell structures of the present invention, the hollow shell may be porous and allow the flow of small molecules to the central core. The central molecule may contain catalytic centers, electrochemical centers, or other types of centers that must be isolated from other centers on the surface of the shell molecule or from the flow medium outside the supramolecular shell structure. The supramolecular shell structure could serve as a housing unit for moieties that can catalyze two sequential reactions where two catalytic moieties would not function if in close physical contact, a moiety that can conduct catalytic chemistry at the core but can be isolated from the flowstream of the plant and might then be removed from the flowstream of the plant by filtration, and a sensor with an exterior shell permeable to some chemicals but not to others, and with a core that could give a color change or other readout when interacting with the chemical to be sensed. Several concentric shells could be synthesized to give the utmost selectivity and sequestering ability.

To assist with the understanding of this invention is a glossary of terms and definitions that are used throughout the specification are provided below.

The terms "supramolecular structure" and "supramolecular assembly," as used throughout this specification, may be used interchangeably and refer to a molecular assembly in which one molecular structure is enclosed within the cross-linked shell of another molecular structure. The encapsulated structure and the shell structure may or may not be covalently or ionically bonded together; therefore, the supramolecular structure can be simplistically thought of as a core molecular structure retained within a cross-linked shell structure. The terms "supramolecular structure" and "supramolecular assembly" also refer to porous, hollow cross-linked shell structures.

The term "cross-linkable moieties" refer to moieties that are sufficiently reactive to undergo addition or substitution reactions with adjacent cross-linkable moieties to form a shell structure.

The term "core dendrimer" refers to the precursor structure of the supramolecular structure. The core dendrimer of the supramolecular structure of the present invention can be freed upon the destruction of the labile bonds connecting the core to the cross-linkable moities.

The term "generation" refers to each successive concentric layer added to the core molecule in the iterative formation of a dendritic structure. The first generation is the monomer layer initially bound to the core molecule while successive generations, for example, the second, third and fourth generations, are bound to the preceding generation. The first generation begins the growth of the dendritic branches.

The term "dendritic branches" refers to each monomer chain extending from the core of the dendrimer or some common atom and therefore each split or branch in a chain can be considered a dendritic branch.

The term "peripheral generation" of the dendrimer or dendritic structure refers to the outermost generation or the generation furthest from the core molecule. The peripheral generation provides a plurality of dendritic branches to which the labile bonds and cross-linkable moieties may be attached.

The term "sufficiently dense" refers to a supramolecular structure having an adequate number of cross-linkable moieties on the periphery of the structure to effect cross-linking.

The term "double cross-linking agent" refers to a cross-linking agent or cross-linker that has two Si—H functional groups that can hydrosilate alkene groups. The term "multiple cross-linking agent" refers to a cross-linking agent or cross-linker that has more than two Si—H functional groups that can hydrosilate alkene groups.

In order to demonstrate the practice of the present invention, the following examples have been prepared and tested as described in the General Experimentation Section disclosed hereinbelow. The examples should not, however, be viewed as limiting the scope of the invention. The claims will serve to define the invention.

GENERAL EXPERIMENTAL

Example Nos. 1–5, herein below describe the process for producing a trivinylchlorosilane covered polypropyleimine (DAB) dendrimer. The reactions were carried out in an inert atmosphere at room temperature and atmospheric pressure. The dendrimer was initially dissolved in toluene or tetrahydrofuran (THF) and the triethylamine and trivinylchlorosilane were subsequently added, respectively. The product was evidenced by the presence of a pale yellow oily product. NMR analysis indicated that the desired product, namely a trivinylchlorosilane-covered dendrimer, had been achieved.

EXAMPLE 1

1.039 grams of DAB-4 dendrimer, a 1.0 generation polypropyleimine dendrimer, was initially dissolved in 30 milliliters of tetrahydrofuran (THF) and was reacted with 3.05 milliliters of trivinylchlorosilane in the presence of 2.74 milliliters of triethylamine. The reaction mixture was stirred overnight.

EXAMPLE 2

2 grams of DAB-8 dendrimer, a 2.0 generation polypropyleimine dendrimer, was initially dissolved in 40 milliliters of toluene, and reacted with 4.01 milliliters of trivinylchlorosilane in the presence of 3.61 milliliters of triethylamine. The reaction mixture was stirred overnight.

EXAMPLE 3

0.5 grams of DAB-16, a 3.0 generation polypropyleimine dendrimer, was initially dissolved in 30 milliliters of toluene, and reacted with 1.10 milliliters of trivinylchlorosilane in the presence of 0.99 milliliters of triethylamine. The reaction mixture was stirred overnight.

EXAMPLE 4

1.423 grams of DAB-32, a 4.0 generation polypropyeimine dendrimer, was initially dissolved in 40 milliliters of toluene, and reacted with 3.10 milliliters of trivinylchlorosilane in the presence of 2.7 milliliters of triethylamine. The reaction mixture was stirred overnight.

EXAMPLE 5

0.8 grams of DAB-64, a 5.0 generation polypropyleimine dendrimer, was initially dissolved in 30 milliliters of toluene and reacted with 1.24 milliliters of trivinylchlorosilane in the presence of 1.38 milliliters of triethylamine. After stirring the reaction overnight, the reaction mixture was filtered and the volatiles were removed at reduced pressure.

The results of NMR analysis on Example Nos. 1–5, above, indicate that the reaction of the terminal primary amine groups of the dendritic branches of the peripheral generation with chlorosilanes results in the formation of trinvinylchlorosilane covered polypropyleimine (DAB) dendrimers, with a high yield conversion of terminal amine groups to NH—Si(CH=CH$_2$)$_3$ groups.

Example Nos. 6–10, below, demonstrate the crosslinking of trinvinylchlorosilane covered polypropyleimine (DAB) dendrimers by hydrosilation with different crosslinking agents.

EXAMPLE 6

Using the trivinylchlorosilane covered polypropyleimine (DAB-16) dendrimer prepared in Example 3, hereinabove, peripheral trivinylsilyl groups of adjacent dendritic branches were cross-linked using tetramethyldisilethylene as the crosslinking agent. Specifically, about 0.30 grams of the trinvinylchlorosilane covered polypropyleimine (DAB) dendrimer prepared in Example 3 (modified DAB-16 dendrimer), was dissolved in about 5 ml of tetrahydrofuran (THF). The dissolved dendrimer was reacted with about 0.39 milliliters of tetramethyldisilethylene crosslinking agent in the presence of a few drops of Karstedt's catalyst. The reaction mixture was stirred and heated at 55° C. for 3 hours. 10 milliliters of tetrahydrofuran was added to the mixture and the reaction was stirred for another 4 hours at 55° C.

EXAMPLE 7

Using the trinvinylchlorosilane covered polypropyleimine (DAB) dendrimer prepared in Example 3, hereinabove, peripheral trivinylsilyl groups of adjacent dendritic branches were cross-linked using tetramethyldisilethylene as the crosslinking agent. Specifically, about 0.126 grams of the trinvinylchlorosilane covered polypropyleimine (DAB) dendrimer prepared in Example 3 (modified DAB-16 dendrimer), was dissolved in about 60 ml of tetrahydrofuran (THF). The dissolved dendrimer was reacted with about 0.165 milliliters of tetramethyldisilethylene crosslinking agent in the presence of a few drops of Karstedt's catalyst. The reaction mixture was stirred and heated at 60° C. for 6 hours.

EXAMPLE 8

Using the trinvinylchlorosilane covered polypropyleimine (DAB) dendrimer prepared in Example 3, hereinabove, peripheral trivinylsilyl groups of adjacent dendritic branches were cross-linked using tetramethyldisiloxane as the crosslinking agent. Specifically, about 0.3 grams of the trinvinylchlorosilane covered polypropyleimine (DAB) dendrimer prepared in Example 3 (modified DAB-16 dendrimer), was dissolved in about 60 ml of tetrahydrofuran (THF). The dissolved dendrimer was reacted with about 0.75 milliliters of tetramethyldisiloxane crosslinking agent in the presence of a few drops of Karstedt's catalyst. The reaction mixture was stirred and heated at 60° C. for 1 day.

EXAMPLE 9

Using the trinvinylchlorosilane covered polypropyleimine (DAB) dendrimer prepared in Example 3, hereinabove, peripheral trivinylsilyl groups of adjacent dendritic branches were cross-linked using hexysilane as the crosslinking agent. Specifically, about 0.3 grams of the trinvinylchlorosilane covered polypropyleimine (DAB) dendrimer prepared in Example 3 (modified DAB-16 dendrimer), was dissolved in about 200 ml of tetrahydrofuran (THF). The dissolved dendrimer was reacted with about 0.204 milliliters of hexysilane crosslinking agent in the presence of a few drops of Karstedt's catalyst. The reaction mixture was stirred and refluxed for 2 days.

EXAMPLE 10

Using the trinvinylchlorosilane covered polypropyleimine (DAB) dendrimer prepared in Example 3, hereinabove, peripheral trivinylsilyl groups of adjacent dendritic branches were cross-linked using tetramethylcyclotetrasiloxane as the crosslinking agent. Specifically, about 0.3 grams of the trinvinylchlorosilane covered polypropyleimine (DAB) dendrimer prepared in Example 3 (modified DAB-16 dendrimer), was dissolved in about 200 ml of tetrahydrofuran (THF). The dissolved dendrimer was reacted with about 0.338 milliliters of tetramethylcyclotetrasiloxane crosslinking agent in the presence of a few drops of Karstedt's catalyst. The reaction mixture was stirred and refluxed for 2 days.

The results of NMR analysis on Example Nos. 6–10, above, indicate the completion of the hydrosilation reactions of the terminal crosslinakble moieties of the dendritic branches of the peripheral generation to form a cross-linked shell structure.

Example Nos. 11–13, below, demonstrate the crosslinking of trinvinylchlorosilane covered fourth generation polypropyleimine (DAB-32) dendrimers by hydrosilation with different crosslinking agents.

EXAMPLE 11

Using the trinvinylchlorosilane covered DAB-32 dendrimer prepared in Example 4, hereinabove, the peripheral trivinylsilyl moieties were cross-linked using tetramethyldisilethylene. Specifically, about 0.52 grams of the modified DAB-32 dendrimer was initially dissolved in 60 milliliters of tetrahydrofuran, and reacted with about 0.67 grams of the tetramethyldisilethylene crosslinking agent in the presence of about five drops of Karstedt's catalyst. The reaction mixture was stirred and heated at 60° C. for 6 hours. An additional 0.33 milliliters of tetramethyldisilethylene was added and the reaction mixture was stirred and heated for 3 hours at 60° C.

EXAMPLE 12

Using the trinvinylchlorosilane covered DAB-32 dendrimer prepared in Example 4, hereinabove, the peripheral trivinylsilyl moieties were cross-linked using MeSi(CH$_2$CH$_2$SiMe$_2$H)$_3$. Specifically, about 0.2 grams of the modified DAB-32 dendrimer was initially dissolved in 60 milliliters of tetrahydrofuran, and reacted with about 0.279 grams of the MeSi(CH$_2$CH$_2$SiMe$_2$H)$_3$ crosslinking agent in the presence of about five drops of Karstedt's catalyst and 10 milliliters of tetrahydrofuran. The reaction mixture was stirred and refluxed for 2 days.

EXAMPLE 13

Using the trinvinylchlorosilane covered DAB-32 dendrimer prepared in Example 4, hereinabove, the peripheral trivinylsilyl moieties were cross-linked using tetramethyldisiloxane. Specifically, about 0.2 grams of the modified DAB-32 dendrimer was initially dissolved in 60 milliliters of tetrahydrofuran, and reacted with about 0.4 grams of the tetramethyldisiloxane crosslinking agent in the presence of about five drops of Karstedt's catalyst and 20 milliliters of tetrahydrofuran. The reaction mixture was stirred and heated at 60° C. for 1 day.

The volatiles were removed from Example Nos. 11–13 at reduced pressure to provide a cross-linked compound, which was a yellow, oily solid. The results of NMR analysis on Example Nos. 11–13, above, indicate the completion of the hydrosilation reactions of the terminal cross-linkable moieties of the dendritic branches of the peripheral generation to form a cross-linked shell structure.

Example Nos. 14–17, below, demonstrate the crosslinking of trinvinylchlorosilane covered fifth generation polypropyleimine (DAB-64) dendrimers by hydrosilation with different crosslinking agents.

EXAMPLE 14

Using the trinvinylchlorosilane covered DAB-64 dendrimer prepared in Example 5, hereinabove, the peripheral trivinylsilyl moieties were cross-linked using tetramethyldisiloxane. Specifically, about 0.2 grams of the modified DAB-64 dendrimer was initially dissolved in 60 milliliters of tetrahydrofuran, and reacted with about 0.220 grams of the tetramethyldisiloxane crosslinking agent in the presence of about five drops of Karstedt's catalyst and 50 milliliters of tetrahydrofuran. The reaction mixture was stirred and refluxed for 1 day.

EXAMPLE 15

Using the trivinylchlorosilane covered DAB-64 dendrimer prepared in Example 5, hereinabove, the peripheral trivinylsilyl moieties were cross-linked using 1,1-dichloro-,3,5-dimethyl-1,3-disilabutane. Specifically, about 0.177 grams of the modified DAB-64 dendrimer was initially dissolved in 70 milliliters of tetrahydrofuran, and reacted with about 0.868 grams of the 1,1-dichloro-,3,5-dimethyl-1,3-disilabutane crosslinking agent in the presence of about five drops of Karstedt's catalyst and 0.22 grams of tetramethyldisiloxane. The reaction mixture was stirred and refluxed for 1 day.

EXAMPLE 16

Using the trinvinylchlorosilane covered DAB-64 dendrimer prepared in Example 5, hereinabove, the peripheral trivinylsilyl moieties were crosslinked using MeSi(CH$_2$CH$_2$SiMe$_2$H)$_3$. Specifically, about 0.1 grams of the modified DAB-64 dendrimer was initially dissolved in 60 milliliters of tetrahydrofuran, and reacted with about 0.184 grams of the MeSi(CH$_2$CH$_2$SiMe$_2$H)$_3$ crosslinking agent in the presence of about five drops of Karstedt's catalyst and 10 milliliters of tetrahydrofuran. The reaction mixture was stirred and refluxed for 2 days.

EXAMPLE 17

Using the trinvinylchlorosilane covered DAB-64 dendrimer prepared in Example 5, hereinabove, the peripheral trivinylsilyl moieties were cross-linked using octakis(dimethylsiloxy)Ts-silsequioxane. Specifically, about 0.15 grams of the modified DAB-64 dendrimer was initially dissolved in 120 milliliters of Et$_2$O. A solution containing 5 drops of Karstedt's catalyst and 0.457 grams of octakis(dimethylsiloxy)T$_8$-silsequioxane crosslinking agent in 40 milliliters of tetrahydrofuran was added dropwise to the modified DAB-64 dendrimer. The reaction mixture was stirred and refluxed for 3 days.

The volatiles were removed from Example Nos. 14–17 at reduced pressure to provide a cross-linked compound, which was a yellow, oily solid. The results of NMR analysis on Example Nos. 14–17, above, indicate the completion of the hydrosilation reactions of the terminal cross-linkable moieties of the dendritic branches of the peripheral generation to form a cross-linked shell structure.

The labile bonds of the dendritic branches were cleaved with aqueous hydrochloric acid, thereby freeing the core dendrimer from the cross-linked peripheral generation to form a molecule encapsulated within the cross-linked shell molecule.

Specifically, 0.2 grams of crosslinked modified DAB dendrimer reaction products obtained from Example Nos. 6, 7, 8, 9, 10, 11, 12, 13, 15, 16 and 17, above, were reacted with 1.2 molar aqueous hydrochloric acid in 10 milliliters of chloroform. The reaction mixture was stirred overnight. The aqueous layer was extracted twice with chloroform. The volatiles were removed under pressure to leave the free core dendrimer. The organic layer was washed twice with water and once with saturated aqueous $NaHCO_3$. The organic layer contained the cross-linked shell product.

Based upon the foregoing disclosure, it should now be apparent that a supramolecular structures, including structures comprising a core molecule encapsulated within a cross-linked shell molecule and hollow cross-linked shell molecules, can be produced from modification of core dendrimer molecules. The selection of the core dendrimer, reactive monomers, crosslinking agents, crosslinking techniques and reaction conditions can be determined by one having ordinary skill in the art without departing from the spirit of the invention herein disclosed and described. Thus, the scope of the invention shall include all modification and variations that may fall within the scope of the attached claims.

We claim:

1. A supramolecular structure comprising:
   a multi-generation dendrimer comprising a core, a plurality of interior generations spherically disposed around the core and an outermost generation comprising a plurality of dendritic branches having terminal groups sufficiently reactive to undergo addition or substitution reactions; and
   at least one cross-linkable moiety bonded to the terminal groups of each dendritic branch via a labile bond; wherein the cross-linkable moieties of adjacent dendritic branches are intramolecularly cross-linked to form a dendrimer having an intramolecularly cross-linked peripheral surface, wherein the core dendrimer contains catalytic centers.

2. The supramolecular structure of claim 1, wherein the dendrimer is selected from the group consisting of poly (propylenimine) (DAB) and polyamidoamine (PAMAM) dendrimers.

3. The supramolecular structure of claim 1, wherein the labile bond is selected from the group consisting of silicon-oxygen, silicon-oxygen-carbon, oxygen-nitrogen, nitrogen-silicon, nitrogen-carbonyl-nitrogen, silicon-acetylene, amide, blocked isocyanates and ureas.

4. The supramolecular structure of claim 3, wherein the labile bond is a nitrogen-silicon bond.

5. The supramolecular structure of claim 1, wherein the dendritic branches are intramolecularly crosslinked by one method selected from group consisting of hydrosilation, olefin metathesis, radical polymerization, polycondensation, anionic polymerization, cationic polymerization and coordination polymerization.

6. The supramolecular structure of claim 5, wherein the crosslinking method is hydrosilation.

7. The supramolecular structure of claim 5, wherein the dendritic branches are crosslinked with a crosslinking agent.

8. The supramolecular structure of claim 7, wherein the crosslinking agent is a double crosslinking agent or a multiple crosslinking agent.

9. The supramolecular structure of claim 8, wherein the multiple crosslinking agent is selected from the group consisting of $CH_3Si(CH_2CH_2Si(CH_3)_2H)_3$; $CH_3(CH_2Si H_2)_2CH_3$; $HC(Si(R)_2H)_3$; $Si(R^1)_2H_2)$; $(SiR^1HO)_4$; linear polymers selected from the group consisting of $(CH_3)_3Si$—O—$(SiR^2H$—O$)_n$—$Si(CH_3)_3$, $H(CH_3)_2Si$—O—$(SiPh($—$OSi(CH_3)_2H)$—O$)_n$—$Si(CH_3)_2H$, $(CH_3)_3Si$—O—$(Si(CH_3)H$—O$)_m$—$(Si(CH_3)(C_8H_{17})$—O$)_n$—$Si(CH_3)_3$, and $H_2R^3Si$ $(SiR^3H)_n$—$SiR^3H_2$; cyclic compounds; a dendrimer; and mixtures thereof; wherein $R_1$ is selected from hydrogen and organic groups having from about 1 to about 15 carbon atoms;

$R^2$ selected from methyl and ethyl groups;

$R^3$ is selected from aryl and alkyl groups having from about 1 to about 15 carbon atoms;

n is a positive integer from about 10 to about 100; and m is a positive integer from about 10 to about 100.

10. The supramolecular structure of claim 8, wherein the double crosslinking agent is of the general formula (I):

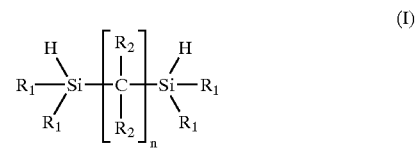

wherein where $R_1$ is selected from the group consisting of hydrogen or organic groups having from about 1 to about carbon atoms, $R_2$ is selected from the group consisting of hydrogen and organic groups having from about 1 to about 30 carbon atoms, and x is an integer from about 1 to about 4.

11. The supramolecular structure of claim 5, wherein olefin metathesis includes the use of a ring opening metathesis polymerization (ROMP) catalyst.

12. The supramolecular structure of claim 5, wherein olefin metathesis includes the use of a cyclic diene metathesis (ADMET) catalyst.

13. The supramolecular structure of claim 5, wherein the coordination polymerization is Ziegler Natta polymerization.

14. The supramolecular structure produced by claim 1, wherein the core dendrimer contains metallocores.

* * * * *

UNITED STATES PATENT AND TRADEMARK OFFICE
CERTIFICATE OF CORRECTION

PATENT NO. : 6,794,327 B2
DATED : September 21, 2004
INVENTOR(S) : Youngs et al.

It is certified that error appears in the above-identified patent and that said Letters Patent is hereby corrected as shown below:

<u>Column 16,</u>
Line 20, "HC(Si(R)$_2$H)$_3$" should read -- HC(Si(R$^1$)$_2$H)$_3$ --
Line 24, "H-O)$_m$" should read -- (H)-O)$_m$ --
Line 47, "about carbon atoms," should read -- about 30 carbon atoms, --

Signed and Sealed this

Third Day of May, 2005

JON W. DUDAS
*Director of the United States Patent and Trademark Office*